United States Patent [19]

Turpin

[11] Patent Number: 4,954,195

[45] Date of Patent: Sep. 4, 1990

[54] PRODUCTION OF THERMOSET COMPOSITES CONTAINING THERMOPLASTIC FILLERS

[75] Inventor: Russell L. Turpin, Canyon Country, Calif.

[73] Assignee: Lockheed Corporation, Calabasas, Calif.

[21] Appl. No.: 309,579

[22] Filed: Feb. 13, 1989

[51] Int. Cl.$^5$ .............................................. B29C 43/20
[52] U.S. Cl. .................. 156/242; 156/244.23; 156/244.27; 156/307.3; 264/136; 264/137; 264/257; 264/258; 264/331.11; 264/331.18; 525/282; 525/524
[58] Field of Search ............... 264/135, 136, 137, 257, 264/258, 331.11; 548/521; 524/726; 525/282, 524; 156/242, 244.23, 244.27, 307.3

[56] References Cited

U.S. PATENT DOCUMENTS

| | | | |
|---|---|---|---|
| 3,920,768 | 11/1975 | Kwiatkowski | 525/282 |
| 4,144,284 | 3/1979 | Semanaz et al. | 528/322 |
| 4,212,959 | 7/1980 | Fukami et al. | 525/524 |
| 4,468,497 | 8/1984 | Street et al. | 525/422 |
| 4,562,231 | 12/1985 | Dean | 525/189 |
| 4,691,025 | 9/1987 | Domeier et al. | 548/521 |
| 4,749,760 | 6/1988 | Wang | 525/471 |
| 4,757,120 | 7/1988 | Bristowe et al. | 525/534 |
| 4,766,179 | 8/1988 | DeKoning | 525/282 |
| 4,834,933 | 5/1989 | Gardner | 264/257 |

OTHER PUBLICATIONS

"The Toughening Effects of PBI in a BMI Matrix Resin," M. T. Blair et al, 33rd International SAMPE Symposium, Mar. 7–10, 1988, pp. 524–537.

"Semi-IPN Matrix Systems for Composite Aircraft Primary Structures", G. R. Almen et al, 33rd International SAMPE Symposium, Mar. 7–10, 1988, pp. 979–989.

*Primary Examiner*—Jay H. Woo
*Assistant Examiner*—Jeremiah F. Durkin, II
*Attorney, Agent, or Firm*—Max Geldin

[57] ABSTRACT

A process for increasing the damage tolerance in thermoset composites without loss of processibility or mechanical properties of the thermoset, by controlled solubility of a thermoplastic filler in the base thermoset. The process includes mixing spherical particles of a selected thermoplastic, such as polyimide, of particle size ranging from about 10 to 80 microns, with a hot thermoset resin, such as a bismaleimide, to form a uniform dispersion of the resin mixture, employing about 5 to about 40% of the thermoplastic by weight of the mixture of the two resins. The particles of thermoplastic are non-agglomerating and insoluble in the resin mixture. The hot resin dispersion is then applied to fiber reinforcement, such as carbon fiber tapes, to form pre-pregs. Upon curing the thermoset at elevated temperature, the thermoplastic particles dissolve in the thermoset resin, forming a composite with no definable boundary interfaces between the thermoplastic and thermosetting resins.

14 Claims, No Drawings

PRODUCTION OF THERMOSET COMPOSITES CONTAINING THERMOPLASTIC FILLERS

BACKGROUND OF THE INVENTION

This invention relates to thermoset composites containing a thermoplastic resin and, more particularly, is concerned with a process for increasing damage tolerance in thermoset composites without loss of processibility or mechanical properties, including thermal stability, by incorporating a thermoplastic filler and controlling the solubility of such thermoplastic material in the thermoset.

Current high temperature thermosets or thermosetting resins exhibit either thermal stability and poor damage tolerance or damage tolerance and poor thermal stability. The term "damage tolerance" as employed herein is intended to denote the ability of a material, such as a thermoset composite to withstand impacts, flaws, holes or other damages to the composite without propagating the damage or causing undue mechanical property loss as a result of such damage.

There has been considerable effort made recently to improve damage tolerance in thermoset matrix resins, particularly in the production of damage tolerant aircraft structures. Epoxy and BMI (bismaleimide) matrix systems are too brittle for primary structures Many epoxy-based resin systems have been toughened by the use of second-phase thermoplastic particles.

The article, "The Toughening Effects of PBI in a BMI Matrix Resin", M. T. Blair, et al, 33rd International SAMPE Symposium, March 7-10, 1988, page 524, notes that second-phase thermoplastics, such as polysulfone, are blended into epoxy resin systems for toughening the epoxy-based resin. This paper then applies this method to a BMI matrix resin, employing polybenzimidazole as thermoplastic.

The article, "Semi-IPN Matrix Systems for Composite Aircraft Primary Structures", G. R. Almen, et al, 33rd International SAMPE Symposium, March 7-10, 1988, page 979, examines the addition of polyaromatic thermoplastic to epoxy resins.

However, the systems of the above articles are generally too brittle and do not provide tough composites having superior damage tolerance characteristics.

Examples in the prior art relating to polymers, such as thermosetting or thermoplastic resins modified by the use of various fillers, are set forth in the patents below.

Patent No. 4,757,120 to Bristowe, et al, discloses a polymer blend of a bismaleimide derivative with 2 to 15% by weight of a polyethersulfone, stated to be useful in producing prepregs and filled composites, particularly useful in structural components having high stability at high temperatures.

Patent No. 4,468,497 to Street, et al, discloses a matrix resin system for graphite fiber composites comprised of a bismaleimide and polyethersulfone.

Patent No. 4,749,760 to Wang discloses a curable resin composition comprising a dicyanate-terminated aromatic polysulfone oligomer and a bismaleimide component.

Patent No. 3,920,768 to Kwiatkowski discloses arylimide-epoxy resin composites. In preparing such composites, arylimides prepared from oligomer diamines and polyamines and maleic anhydride are blended with epoxy resins which can be cured to thermoset composites.

Patent No. 4,562,231 to Dean discloses moldable polymer compositions comprising a polyethersulfone resin and a copolymer containing recurring units of a vinyl aromatic monomer and recurring units of a maleimide monomer Patent No 4,766,179 to DeKoning discloses a bismaleimide composition comprising a bismaleimide compound and including an alkylacrylate component.

Patent No. 4,144,284 to Semanaz, et al, discloses shaped articles consisting essentially of a matrix of a thermoplastic polymer, such as polyethylene or polypropylene, in which there is dispersed, in the form of particles of mean diameter less than 200 microns, a polyimide resin.

Patent No. 4,212,959 to Fukami, et al, discloses a heat resistant resin composition comprising a mixture including a maleimide component and an epoxy resin.

Patent No 4,691,025 to Domeier, et al, discloses bismaleimides and prepreg resins therefrom comprising bismaleimide and optionally a thermoplastic polymer, such as a polysulfone.

However, none of the above patents is directed to the concept of increasing damage tolerance in thermoset composites by incorporation of thermoplastic fillers through controlled solubility of such fillers in the thermoset.

One object of the present invention is the provision of thermoset composites having increased damage tolerance without loss of processibility or mechanical properties.

Another object is the provision of a process for the addition of thermoplastics to thermoset matrix resins without changing the processing and physical characteristics of the thermosets.

Still another object is to provide procedure for the incorporation of relatively large amounts of a thermoplastic resin in a thermoset resin matrix by controlled solubility of the thermoplastic filler in the thermoset, so that upon curing of the system, a substantially homogeneous material comprised of the two resins is obtained, having improved composite damage tolerance and good thermal stability.

Yet another object is the provision of thermoset-thermoplastic compositions which can be converted into pre-pregs and composites having enhanced damage tolerance as compared to the thermoset resin per se, and good thermal stability and mechanical properties, and to the provision of the improved pre-pregs and improved composites so produced.

Other objects and advantages of the invention will be apparent from the description below of the invention.

SUMMARY OF THE INVENTION

According to the invention concept, by controlling the solubility of a thermoplastic powder or filler, such as a polyimide, in a thermoset matrix, such as a bismaleimide, a composite material can be developed which exhibits the high temperature stability, stiffness and ease of processing characteristics of thermosets, while adding the damage tolerance characteristic of thermoplastics. The process comprises reforming selected thermoplastics out of solvent solution to obtain spherical thermoplastic particles of a certain size range, as noted below, and adding such particles to the thermoset in certain proportions and under conditions such that the particles of thermoplastic are non-agglomerating in the thermoset resin and are insoluble therein. However, upon increase in temperature during subsequent curing, e.g., at 350° F., the thermoplastic becomes inherently soluble in the thermoset and readily goes into solution into the base thermoset resin. The result upon curing is that while the cured matrix is a two-phase system, the structure of the system appears substantially homogeneous, with no hard lines of demarcation from one phase to the other, that is, a concentration gradient. This results in a thermoset composite material which is both damage tolerant and thermally stable.

Briefly, in carrying out the invention, a selected thermoplastic material, e.g., thermoplastic polyimide, is dissolved in a suitable solvent, and the thermoplastic is then reformed or recrystallized out of solution from amorphous particles into spheres of a size ranging from about 10 to 80 microns The spheres of selected thermoplastic are mixed with hot liquid thermoset resin, such as a bismaleimide, in proportions, e.g., ranging from about 5 to about 40% of the thermoplastic, by weight of the mixture, to form a uniform dispersion of the resin mixture. Under these conditions, the thermoplastic particles are non-agglomerating in the base thermoset resin.

The resulting resin mixture or dispersion of thermoset resin and thermoplastic particles is applied to reinforcement fibers, such as carbon fiber tape, and forming a pre-preg. The temperature is then raised, e.g., to about 350° F., while applying suitable pressure, e.g., 85 psi, for curing of the thermoset. During the high temperature cure cycle, the thermoplastic resin dissolves in the base thermoset resin, forming a composite in the form of a damage tolerant matrix. The structure of the composite shows a substantially homogeneous distribution of the thermoplastic in the thermoset matrix, with no definable interface boundaries.

DETAILED DESCRIPTION OF THE INVENTION AND PREFERRED EMBODIMENTS

Preparation of the Thermoplastic Filler Particles

The thermoplastic component is a suitable thermoplastic resin which is ductile and behaves as a true plastic rather than as a glass. Such suitable resin has the property of being soluble in the thermoset resin at elevated curing temperature thereof and increases the damage tolerance of the resulting composite, over that of the thermoset per se, without adversely affecting the mechanical properties of the thermoset. It also should have a high glass transition temperature (Tg).

Various thermoplastics have been found suitable for use in the invention process. A preferred thermoplastic is polyimide thermoplastic, for example, the material Matrimide 5218 marketed by Ciba-Geigy. Other thermoplastics which can be employed include polysulfone thermoplastics, such as polyphenylene sulfide, polyether sulfone, and polyaryl sulfone, polyether ketone, and also polycarbonate, or mixtures thereof.

The thermoplastics are first recrystallized and reformed by dissolving the thermoplastic in a suitable solvent, such as methylene chloride, and then precipitating the thermoplastic out of solution under controlled conditions, as by adding a precipitating agent, such as heptane. After filtering and drying, the reformed particles should have certain physical characteristics. A key to obtaining the increase in damage tolerance of the composite according to the invention is the method of processing the thermoplastic to obtain the proper particle size and shape. Thus, the reformed particles of thermoplastic should be substantially spherical in shape and have a particle size ranging from about 10 to about 80 microns, preferably about 20 to about 40 microns. If necessary, the recrystallized reformed particles of thermoplastic can be subjected to light grinding so that substantially all of the spherical particles are of a size within the above size range.

Further, the reformed thermoplastic particles should be insoluble in the base thermosetting resin at room temperature and at higher processing temperatures achieved prior to curing, e.g., ranging from about 140 to about 230° F. The thermoplastic particles, however, should be subsequently soluble in the base resin during curing at substantially elevated temperatures. Thus, while reprocessing or reforming the thermoplastic resin at room temperature or at normal pre-preg processing temperature, e.g., 150° F., the solubility of the thermoplastic in the thermoset resin is so low that the thermoplastic particles will not agglomerate in the thermoset. However, when temperature is increased under curing conditions, e.g., up to 350° F. and under a pressure of 85 psi, the thermoplastic particles become soluble in the base thermoset resin and will readily pass into solution therein. This is a principle feature of the invention, namely, controlled solubility of the thermoplastic in the base thermoset resin.

Preparation of Pre-Preg Resin by Addition of Thermoplastic Particles to Base Thermoset Resin Various thermosetting resins are suitable for use as the base resin matrix according to the invention. While bismaleimide is the preferred thermoset employed according to the invention, other thermosets including, for example, epoxy, epoxy novolak, isocyanurate, acrylate, methacrylate, acetylene-terminated resins, and mixtures thereof can be employed.

The spheres of selected thermoplastic, such as polyimide, are mixed with the hot thermoset resin, such as bismaleimide, to form a uniform dispersion of the resin mixture. For this purpose, usually the thermoset resin, in the absence of solvent, is heated at a temperature so that the thermoset resin is in liquid form, e.g., 150 to 200° F., and the thermoplastic particles are added gradually to the hot liquid thermoset resin while the mixture is subjected to stirring. The amount of thermoplastic resin particles added to the thermoset resin can range from about 5 to about 40%, preferably about 10 to about 30%, by weight of the mixture of thermoset and thermoplastic resins.

The resulting resin mixture of thermoset matrix resin, e.g., bismaleimide, and thermoplastic filler particles, e.g., polyimide particles, can be cooled and applied to reinforcement fibers, e.g., carbon fiber, fiberglass, or the like, in known manner, to produce a pre-preg tape or fabric. A plurality of such tapes can be formed into a laminate and the resulting laminate of pre-preg tapes then subjected to curing, as by heating at a temperature, e.g., of the order of about 350° F., and under pressure, e.g., about 85 psi.

As previously noted, during cure of the thermoset matrix resin, the small particles of thermoplastic resin become soluble in the thermoset and commence to go into solution. At the end of the cure cycle, it has been observed that there is an in situ thermoplastic interleaf formed by concentrating the thermoplastic between fiber plies, with no discernable interface or line of demarcation between the thermoplastic filler and the thermoset base resin. By controlling the solubility of the thermoplastic in the thermoset resin, areas of high concentrations of thermoplastic and of thermoset resins are established, with concentration gradients in between and with no definable interface boundaries. The resulting composite material obtained is both damage tolerant as afforded by the thermoplastic filler, without affecting the mechanical properties of the thermoset, and is thermally stable.

It has been found particularly that certain combinations of thermoplastic resin filler and thermosetting resin matrix produce superior results employing the invention principles. Thus, while various combinations of such resins can be employed, the following selective combinations are particularly applicable. These include polyimide thermoplastic and bismaleimide thermoset; polyimide thermoplastic and epoxy or epoxy novolak thermoset; polyimide thermoplastic and isocyanate or isocyanurate thermoset; polyphenylene sulfide, polyether sulfone, polyaryl sulfone, or polycarbonate thermoplastic, respectively, and epoxy thermoset; and polyphenylene sulfide, polyether sulfone or polyaryl sulfone, respectively, with acrylate or methacrylate, or mixtures thereof, as thermoset.

The following are examples of practice of the invention:

EXAMPLE 1

500 grams of distilled water and 1.0 gram of a defoaming agent such as octyl alcohol are placed in a 4 liter beaker. A pre-mixed 10% by weight solids solution of polyimide thermoplastic, marketed as Matrimid 5218 by Ciba-Geigy, in methylene chloride, or other solvent compatible with the thermoplastic, is prepared. The beaker of distilled water is placed on a stirrer plate and the contents stirred, adjusting the speed until a vortex is formed.

750 grams of the thermoplastic solution is dripped into the water at a rate of 70–80 ml/min. Simultaneously, 1.5 grams of the defoaming agent is added dropwise over the same time period. When all of the thermoplastic solution has been added, the funnel used for feeding the thermoplastic solution to the water is washed into the beaker with the methylene chloride solvent used for the solution. The solution is mixed at a high shear rate for 5 minutes, and during this period, 390 mls of heptane is added at a rate of 70 ml/min. Precipitation of the thermoplastic in the water occurs, and the stirring of the suspension is continued at high speed for 45–60 minutes after addition of all material The precipitate is vacuum-filtered in a Beuchner funnel, while continuously stirring the suspension not being filtered. The filtrate is washed with a 50/50 solution of acetone/water three times or until foaming ceases. The filtrate is placed in a drying pan and dried for 45 minutes at 450° F. and full vacuum. After the thermoplastic material is dried, the material is lightly ground in a mortar and pestal and passed through a 125 mesh screen. Any particles not passing through the screen can be reground and sieved. The ground thermoplastic powder for use as the filler in the resin is produced in a yield of about 98% of the filtrate and 130% of the starting weight. The resulting thermoplastic particles are of spherical shape and are of a size ranging from about 20 to about 40 microns.

A heated mixture or composition is formed of bismaleimides (BMI) designated BMI #1 and BMI #2 of the general formulation:

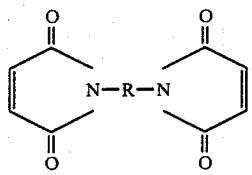

with a diallylic monomer and triallylic monomer of the general compositions:

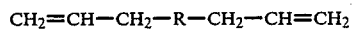

and

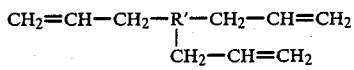

where R is bisphenol A or other aromatic groups and R' is a mellitate group. The mixture has the mix ratio of:

| BMI #1 | 1236 grams |
| BMI #2 | 989 grams |
| Diallylic | 795 grams |
| Triallylic | 160 grams |

In the above bismaleimide composition or mixture, BMI #1 is a bismaleimide marketed as Compimide 796, and BMI #2 is a bismaleimide marketed as Compimide 353, both by Technochemie, a subsidiary of Shell Oil Company. This is a eutectic blend of the two bismaleimides. These two BMI components contain high and low molecular weight monomers. The BMI #2 material has a lower melting point than the BMI #1 material. It is noted that the diallylic and triallylic monomers are liquid, with the BMI components dissolved therein. No solvents are otherwise used in the above BMI composition.

The above components of the BMI composition are combined in a one gallon mixing vessel while stirring constantly until a one-phase solution is obtained. The final mixture is brought to 80° C. and 565 grams of the polyimide thermoplastic spherical particles, prepared as described above (20% by weight of the mixture of polyimide and bismaleimide composition), is stirred into the liquid bismaleimide mixture. A uniform dispersion of the insoluble non-agglomerated powder particles in the bismaleimide liquid resin is obtained, and the resin is cooled to room temperature. The thermoplastic particles act as a filler for the bismaleimide resin system to which it is added.

The resin dispersion is then applied as a film to carbon fiber tape to form a pre-preg tape. The carbon fiber pre-preg tapes so prepared are laminated to form a laminate by compaction, and the compacted laminate is then subjected to curing at 350° F. and 85 psi pressure to form a composite in which the polyimide particles are dissolved within the bismaleimide thermoset matrix with no clear lines of demarcation between the polyimide thermoplastic particles and the bismaleimide thermoset matrix. An in situ formed interleaf of thermoplastic is established between carbon plies. The controlled solubility of the polyimide particles in the bismaleimide resin results in a cured composite having enhanced damage tolerance and good thermal stability, water resistance, and mechanical properties. The dry Tg of the cured BMI composite is 600° F., and the tested wet Tg for this composite is 550° F. Water absorption in the composite without thermoplastic is 1.2-1.3% while water absorption of the composite with thermoplastic is 0.6%.

EXAMPLE 2 through 4

Example 1 is repeated, except additions of 115 grams (5% by weight) in Example 2, 385 grams (15% by weight) in Example 3, and 934 grams (30% by weight) in Example 4 of the polyimide thermoplastic were used. These compositions yield the same basic result as in Example 1, except the amount of increase in damage tolerance is slightly increased or decreased as a function of the amount of thermoplastic used, the larger the amount of polyimide used, the greater the increase in damage tolerance. The highest thermoplastic content leaves traces of the thermoplastic undissolved in the cured neat resin.

EXAMPLE 5

Example 1 is repeated, except 1453 grams (39.5% by weight) of the polyimide thermoplastic is added. The increase in damage tolerance is about equivalent to that of Example 1. A distinct two-phase neat resin is observed in the cured state because all of the thermoplastic is not dissolved.

EXAMPLE 6

Example 1 is repeated, except the BMI composition is replaced with a mixture of 1236 grams of the diglycidyl ether of bisphenol A and 986 grams of an epoxylated novolak. 12 grams of a triphenyl phosphene catalyst are added to promote the cure. The Tg of the material increases from about 350° F. for the epoxy thermoset resin to 450° F. for the epoxy resin containing the polyimide thermoplastic, and the amount of water absorbed is reduced from 5.4% in the neat epoxy resin to 2.5% in the neat epoxy resin containing the thermoplastic. The polyimide thermoplastic is dissolved into the epoxy novolak resin as seen in Example 1. Results obtained are similar to Example 1.

EXAMPLE 7

Example 6 is repeated, except about 75% of the epoxies are replaced with isocyanurate resins. The results are comparable to that in Example 6.

Example 8

Example 1 is repeated, except that the BMI's used are commercial pre-blends of the BMI of methylene dianiline and isocyanurate resins marketed as BT resins by Mitsubishi. The BT resins form a two-phase system, and the damage tolerance is limited by the second phase developed during the cure of the BT resins. Improvements of the same order as in Example 1 are obtained for Tg and water absorption for the composite containing the BT resins.

EXAMPLES 9 through 12

Example 6 is repeated except polyphenylene sulfide thermoplastic (PPS) is used in Example 9, polyether sulfone thermoplastic (PES) is used in Example 10, polyaryl sulfone thermoplastic (PAS) is used in Example 11, and polycarbonate thermoplastic is used in Example 12, in the same amount and instead of the polyimide thermoplastic of Example 6. The results obtained are similar to Example 1 employing the polyimide thermoplastic, except that the change in properties is dependent on the properties of the thermoplastic used.

EXAMPLES 13 through 15

Examples 9 through 11 are repeated, except that the epoxies are replaced with a mixture of the same amount of acrylates and methacrylates, and adding the free radical catalyst dicumyl peroxide The results obtained are similar to those of Example 6, employing the corresponding epoxies.

From the foregoing, it is seen that by employing procedure embodying as an essential feature or concept the controlled solubility of a thermoplastic in thermoset composites, together with other features as described above, a composite material can be obtained which is both damage tolerant and thermally stable, as well as possessing good strength and mechanical properties Thus, in accordance with the invention, a readily processible thermoset material forming a thermoset matrix containing thermoplastic fillers is provided with the damage tolerance characteristics of the thermoplastic while also retaining the processing and compressive properties of the thermoset, without loss of resistance to attack by water and while having good temperature stability.

While particular embodiments of the invention have been described for purposes of illustration, it will be understood that various changes and modifications within the spirit of the invention can be made, and the invention is not to be taken as limited except by the scope of the appended claims.

What is claimed is:

1. In a process for producing thermoset composites, the steps which comprise:
    providing a suitable thermoplastic resin composition comprised of particles of a suitable thermoplastic resin having a particle size ranging from about 10 to about 80 microns,
    providing a base thermosetting resin curable by heating, said thermoplastic resin being insoluble in said thermosetting resin at room temperature and at elevated processing temperatures prior to curing, but soluble in said thermosetting resin at cure conditions thereof, and
    mixing said particles of thermoplastic resin and said thermosetting resin in liquid form in a proportion of about 5% to about 40% of said thermoplastic resin, by weight of said mixture, and forming a substantially uniform dispersion of said thermoplastic resin particles and said thermosetting resin, said particles of thermoplastic resin being substantially non-agglomerating in said thermosetting resin.

2. The process of claim 1, said thermoplastic resin being ductile and capable of increasing the damage tolerance of the cured composite formed from said thermosetting resin, over that of the thermosetting resin per se, and said thermoplastic resin particles being substantially spherical.

3. The process of claim 1, including applying said mixture of thermoplastic resin and thermosetting resin to the surface of reinforcement fibers and forming a pre-preg, and curing the thermosetting resin by heating at elevated temperature, said thermoplastic resin dissolving in said base thermosetting resin during curing.

4. The process of claim 1, said thermoplastic resin being provided by recrystallizing and reforming said thermoplastic resin particles from a solution of said thermoplastic resin, and grinding said recrystallized and reformed thermoplastic particles to a size ranging from about 20 to about 40 microns.

5. The process of claim 4, including forming a film of said mixture of said thermoplastic resin and thermosetting resin on carbon fibers to form a carbon fiber pre-preg tape, compacting a plurality of said tapes or plies, and heating said tapes at elevated temperature to cure the thermosetting resin in said tapes, said thermoplastic resin dissolving in said base thermosetting resin during curing, and forming a thermosetting composite comprising a thermoplastic resin filler, including a thermoplastic interleaf between carbon plies, said composite having increased damage tolerance without substantially affecting the mechanical properties of the thermoset.

6. The process of claim 1, said thermoplastic resin selected from the group consisting of polyimide, polyphenylene sulfide, polyether sulfone, polyaryl sulfone, polyether ketone, and polycarbonate, and mixtures thereof, and said thermosetting resin selected from the group consisting of bismaleimide, epoxy, epoxy-novolak, isocyanurate, acrylate and methacrylate resins, acetylene-terminated resins, and mixtures thereof.

7. A process for producing a composite which is damage tolerant and thermally stable by controlled solubility of thermoplastic resin fillers in a thermosetting resin, which comprises:
dissolving a suitable thermoplastic resin in a suitable solvent,
recrystallizing and reforming said thermoplastic resin from said solvent, to form substantially spherical particles of said thermoplastic resin having a particle size ranging from about 10 to about 80 microns,
providing a base thermosetting resin in a liquid medium at elevated temperature, said thermosetting resin being curable by heating, said thermoplastic resin being insoluble in said thermosetting resin at room temperature and at processing temperatures ranging from about 140 to about 230° F. but soluble in said thermosetting resin at increased temperature under cure conditions thereof,
incorporating said particles of thermoplastic resin into said liquid medium containing said thermosetting resin, while stirring the mixture, in a proportion of about 5% to about 40% of said thermoplastic resin, by weight of the mixture,
applying said mixture of thermoplastic resin and thermosetting resin to the surface of reinforcement fibers and forming a pre-preg, and
curing the thermosetting resin by heating at elevated temperature, said thermoplastic resin dissolving in said base thermosetting resin during curing.

8. The process of claim 7, said particles of thermoplastic resin having a particle size ranging from about 20 to about 40 microns, and employing a proportion of about 10% to about 30% of said thermoplastic resin, by weight of the mixture.

9. The process of claim 7, said recrystallizing and reforming of said thermoplastic resin being achieved by adding a substance which precipitates said thermoplastic resin particles from the solvent solution thereof, recovering said particles of thermoplastic resin from said solvent solution, and grinding the thermoplastic resin particles to about 10 to about 80 microns particle size.

10. The process of claim 7, wherein said reinforcement fibers comprise a carbon fiber tape, and forming a pre-preg thereof, assembling a plurality of plies of said pre-preg tape in the form of a laminate, and curing said laminate under heat and pressure.

11. The process of claim 8, said thermoplastic resin selected from the group consisting of polyimide, polyphenylene sulfide, polyether sulfone, polyaryl sulfone, polyether ketone, and polycarbonate, and mixtures thereof, and said thermosetting resin selected from the group consisting of bismaleimide, epoxy, epoxy-novolak, isocyanurate, acrylate and methacrylate resins, acetylene-terminated resins, and mixtures thereof.

12. The process of claim 7, said thermoplastic resin being a polyimide and said thermosetting resin being a bismaleimide.

13. The process of claim 7, said thermoplastic resin being a polyimide and said thermosetting resin being an epoxy resin.

14. The process of claim 7, said thermoplastic resin being a polysulfone and said thermosetting resin being an epoxy resin.

* * * * *